United States Patent [19]

Love et al.

[11] 4,454,787
[45] Jun. 19, 1984

[54] VARIABLE DRIVE FOR A HARVESTER FUNCTIONAL ELEMENT

[75] Inventors: Mahlon L. Love, Osco; Leon J. Corkery, Moline, both of Ill.

[73] Assignee: Deere & Company, Moline, Ill.

[21] Appl. No.: 299,277

[22] Filed: Sep. 4, 1981

[51] Int. Cl.³ .......................... F16H 3/44; F16H 37/00
[52] U.S. Cl. ...................................... 74/781 R; 74/689
[58] Field of Search ...................... 74/689, 781 R, 784, 74/802, 751; 56/11.1, 11.4; 192/4 R

[56] References Cited

U.S. PATENT DOCUMENTS

| | | | |
|---|---|---|---|
| 2,159,426 | 5/1939 | Dunn | 74/781 R |
| 2,611,227 | 9/1952 | Keller | 56/11.1 |
| 2,810,303 | 10/1957 | McGay | 74/802 |
| 3,146,633 | 9/1964 | Schmitter | 74/812 |
| 3,175,425 | 3/1965 | Horne et al. | 74/745 |
| 3,251,243 | 5/1966 | Kress | 74/689 |
| 3,375,738 | 4/1968 | Love | 74/740 |
| 3,430,505 | 3/1969 | Oliva et al. | |
| 3,543,767 | 12/1970 | Witzel | 130/27 |
| 4,133,225 | 1/1979 | Love | 74/789 |
| 4,138,837 | 2/1979 | Love | 56/11.2 |
| 4,346,627 | 8/1982 | Kawamoto et al. | 74/869 |

FOREIGN PATENT DOCUMENTS 1507412 12/1969 Fed. Rep. of Germany .
2606587 9/1976 Fed. Rep. of Germany .

Primary Examiner—Allan D. Herrmann
Assistant Examiner—Bruce F. Wojciechowski

[57] ABSTRACT

In a drive system for the threshing cylinder of a combine harvester, a conventional infinitely variable V-belt drive, is combined with a two-speed final drive assembly. In the final drive assembly, an epicyclic gear train is housed within the body of a driven sheave carried on the cylinder shaft. A sun gear of the gear train is controllable externally of the sheave body and may be pinned for rotation with the sheave in a direct drive mode, or nonrotatably secured relative to the combine body for a cylinder speed reducing mode. The combine cylinder speed is therefore infinitely variable within, selectively, either an upper range or a lower range.

5 Claims, 5 Drawing Figures

VARIABLE DRIVE FOR A HARVESTER FUNCTIONAL ELEMENT

BACKGROUND OF THE INVENTION

This invention concerns drives for agricultural machine elements and more particularly a variable speed drive especially useful for driving a harvesting machine element such as the threshing cylinder of a combine.

Variable speed drives for harvesting machine elements make it possible to adjust element speed to optimise performance in a particular operating condition or crop type. Thus, drive systems for combine harvester threshing cylinders commonly include a variable speed component such as an infinitely variable V-belt drive having, however, an inherently limited speed range.

The speed range available is sometimes extended by including a changeable gear drive in the drive system so that the infinitely variable speed feature is available in two or more ranges. U.S. Pat. No. 3,375,738 Love, also assigned to the assignee of the present invention, discloses a drive of this general type. However, the geared portions of known drive systems are generally somewhat complex and bulky, particularly in terms of axial extent. Typically, even in co-axial gear-driven sheave arrangements, the driven sheave is axially and structurally separated from the final drive gear assembly. Manufacturing cost of such drives is relatively high and their bulk limits their adaptability.

SUMMARY OF THE INVENTION

Accordingly, it is an object of the present invention to provide, preferably in combination with a belt drive, a compact, simple, relatively low cost rotatable final drive transmission, co-axial with the shaft of a rotatable element of an agricultural machine and selectively operable in at least two modes to provide at least two driven speeds for the element relative to the input speed of the transmission. In keeping with the invention, the final drive transmission may be combined with or powered by a variable speed input directly to a driven surface of the final drive transmission. For example, the perimeter of the final drive transmission may include one or more V-belt grooves engaged by the V-belt or belts of a belt portion of the final drive to the machine element. When the sheaves of this portion of the drive are of fixed diameter, the driver may be driven at a speed infinitely variable within the range provided by a variable speed belt drive connected to a power source on the machine.

Preferably, the final drive transmission includes a reduced speed output mode so that, when it is belt driven, relatively high drive belt speeds may be maintained at relatively low driven element speeds so as to reduce belt loading and extend belt life.

In a preferred embodiment of the invention, a driven sheave or pulley carried co-axially on the shaft of a rotatable harvester machine element, includes a body at least partly housing and carrying a gear train for transmitting power from the drive input perimeter surface of the sheave to the driven shaft. V-belt grooves of the sheave perimeter may axially overlap the gear train so that the axial extent of the final drive arrangement is minimized. The body of the sheave may be modified to form a housing for enclosing the gear train. A member of the gear train may be selectively controllable by means external to the housing so as to provide a choice of output speeds and hence driven speeds for the machine element.

The gear train, carried and contained by the sheave body, may include an epicyclic gear set having a pair of sun gears in constant engagement with a compound planetary set carried by the sheave body. Drive input is thus through the planetary set and output is through a first sun gear coupled directly to the shaft. A second or input sun gear my selectively be held from rotation, so that drive is indirect and output speed depends on the gear train ratios; or the second sun gear may be connected so as to turn with the sheave assembly so that the shaft is driven directly at sheave rotational speed.

In a preferred embodiment, the indirect drive results in a reduced output speed and hence the possibility of higher torque loading of the driven element. In some applications, it may be desirable to provide a load limiting device in the drive train to provide automatic disconnect and avoid overloading of driven members. For example, a disconnect element such as a shear bolt may be provided in the means for holding the second sun gear from rotation. This latter means may for example, be a control link tying the second sun gear to the frame of the harvester.

An advantage of a transmission according to the invention is its compactness, particularly in overall axial extent, making it more readily adaptable to existing machines where space may be limited. Another advantage is that a transmission according to the invention provides a self-contained unitary speed-changing assembly, independent of the remainder of the drive system. Thus it may be replaced by a simple drive element such as a sheave or pulley in installations where the speed-changing feature is not required.

DESCRIPTION OF THE PREFERRED EMBODIMENT

Figure 1:
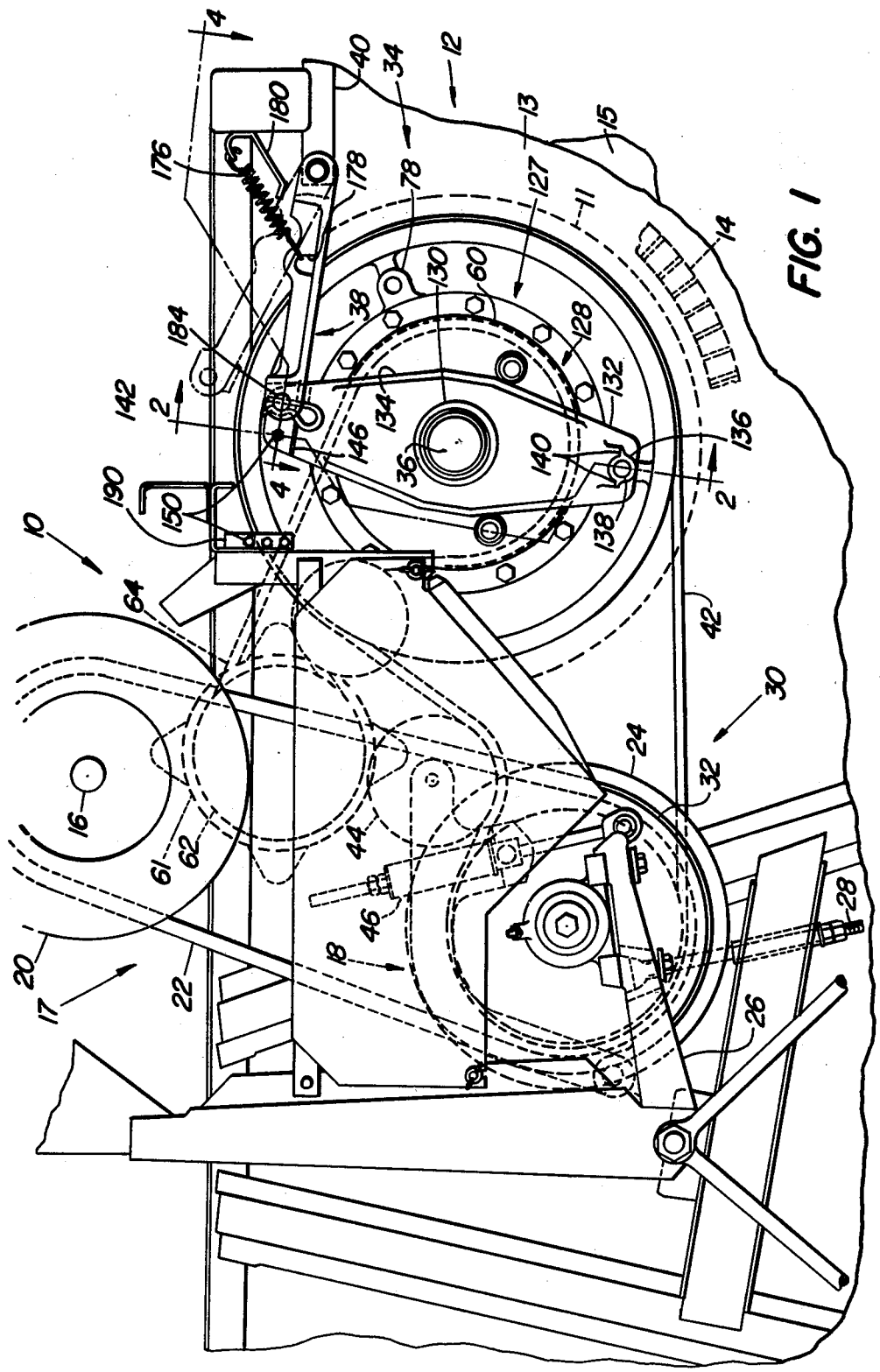
FIG. 1 is a partial right-hand side view of a forward portion of the separator body of a combine harvester showing the drive system for the combine threshing cylinder and includes an embodiment of the invention. Some drive and structural elements have been omitted for clarity.

The invention is embodied in the drive system for the threshing cylinder of a conventional combine harvester shown only partially in FIG. 1. The drive system 10 and threshing cylinder 11 (indicated in hidden outline only, in FIG. 1) are carried at the forward end of the combine separator body 12 with the principal components of the drive system 10 adjacent to but outboard of the right-hand separator body wall 13. The threshing cylinder 11 and associated concave 14 extend between and are supported by the opposite right and left-hand body walls, 13 and 15 respectively.

The drive system 10 includes a primary countershaft 16 receiving power from the combine engine (not shown) and transmitting it by variable speed V-belt drive 17 to an intermediate countershaft assembly 18. (Other V-belt drives powered by the primary countershaft 16 are omitted, as are some structural details, to simplify the drawing.) The variable speed drive 17 may be conventional with drive sheave 20 being hydraulically adjustable (not shown). In operation, the center distance of this drive is fixed but the intermediate countershaft assembly 18, including driven pulley 24 is carried on a pivoted cradle arrangement 26 which may be adjusted by means of draw bolt 28 to set center distance, to compensate for length variations in drive belt 22 while still maintaining the designed speed range.

The final drive to the threshing cylinder 11 is by a fixed speed-ratio multiple V-belt drive 30 comprising a drive sheave 32 included in the countershaft assembly 18 and directly driven from the pulley 24, and a transmission assembly 34 carried on the threshing cylinder shaft 36 and associated with a control link 38, pivotally supported at its forward end by pivot bracket 40 carried by the combine body 12. A set of V-belts 42 trained around the sheave 32 and transmission assembly 34 transmits power between them. Belt tension in this fixed center drive is maintained by a conventional back-side idler 44 controlled by a tensioning device 46. The cylinder shaft 36 is journaled in conventional bearings 48 carried by the separator body sidewalls 13, 15 (only the right hand is shown—FIG. 2).

In the transmission assembly 34 (FIG. 2), torque input to the cylinder shaft 36 is by a splined drive hub 50 carried by the shaft immediately outboard of the bearing 48. The inboard end of the hub 50 has a radially extending flange 52 while the outboard end has an external spline 54 ending adjacent a shouldered bearing support portion 56 which carries a conventional single row ball bearing assembly 58. A beater drive sheave 60 mounted concentrically on the hub flange 52 drives a beater feeder 61 (indicated in hidden outline only, in FIG. 1) downstream of the threshing cylinder 11 through a driven sheave 62 and drive belt 64.

Rotatably supported on the drive hub 50 by the bearing 58 is an inboard transmission assembly sheave portion 66, the body portion 68 of which includes a wall 70 having an outwardly offset outer portion 72 carrying a concentric rim 74 with V-belt grooves 76 for engaging the belts 42. Three equally circumferentially spaced control bosses 78 integral with the sheave wall outer portion 72 extend outward from the wall, each including an axially extending bore 80. The body 68 of the sheave portion 66 also includes a concentric annular wall 82 extending axially outboard from approximately the inner edge of the wall portion 72 and terminating in a machined surface 84 perpendicular to the rotational axis of the sheave portion 66 and helping to define a gear housing cavity 85. What may be considered as a sheave-portion subassembly is completed by the mounting on the splined portion 54 of hub 50 an internally and externally splined sleeve 86 carrying an external snap ring 88.

The rotatable portion of the transmission assembly 34 is completed by a gear subassembly 90, secured by appropriate hardware (such as the exemplary cap screw 92 shown in FIG. 2) to the sheave inboard portion 66. In this subassembly, a first or output sun gear 94 is normally supported concentric with the shaft 36 by the mating of its internally splined bore 96 with the external spline of the sleeve 86 and maintained in axial alignment by the snap ring 88. A second or input sun gear 98 is journaled on the outboard end of the cylinder shaft 36 by inner and outer tapered roller bearings, 100 and 102 respectively. A spacer 104 facilitates control of bearing adjustment. An elongated outwardly extending hub portion of the second sun gear 98 includes a bearing support shoulder 106 adjacent the gear proper and an externally splined portion 108 towards its outer end. Another single row ball bearing 58 is carried by the shoulder portion 106.

Rotatably supported on the shaft 36 by the second bearing 58 is a sheave body outboard portion 110, comprising a generally radially extending wall 112, a central hub 114 housing the second bearing 58 and a peripheral machine annular face 116 for mating with the machined surface 84 of the annulus 82 of the sheave body inboard portion 68. To complete the epicyclic gear train, generally concentric and annular planetary carrier portion 118 of the sheave portion 110 extends into the gear housing cavity 85 from the wall 112 and carries three equally spaced compound planetary pinions 120 (only one visible in FIG. 2). Each compound pinion includes first and second planet pinions 122, 124, mating respectively with the first and second sun gears 94 and 98 respectively and journaled on pins 125 retained in the planetary carrier portion 118. An annular planetary retaining ring 126, secured to the planetary carrier portion 118, completes the gear subassembly 90.

Immediately outboard of the sheave body portion hub 114, and carried concentrically and nonrotatably on the sun gear hub spline portion 108 is a torque arm assembly 127. It comprises a torque arm 128 with a central hub portion 130 and somewhat similar diametrically opposed arms-direct-drive and reduced speed arms, 132 and 134 respectively. The extremity of each arm is uniquely formed to suit its particular function in the transmission assembly 34. The direct drive arm 132 carries a simple boss 136 with a bore 138 having an axis parallel to the cylinder shaft 36 and registerable with any one of the three bores 80 of the sheave portion 66. Straddling the bore 138 on the outer face of the boss 136 is a pair of stop shoulders 140. The reduced speed control arm portion 134 includes at its extremity, a somewhat similar boss 142 with a shear pin hole 144 paralleling the cylinder shaft 36 but at a slightly greater radius from the shaft than the opposite bore 138 of the direct drive portion. The shear bolt boss 142 is offset from the center line of the arm 128 and is associated with a shoulder 146 perpendicular to the axis of the arm.

A short shear link 148 extending generally circumferentially with respect to the torque arm 128, is clamped to the shear bolt boss 142 by a shear bolt with nut 150 passing through similarly sized holes—152 in the shear link 148 and 144 in the shear bolt boss 142 respectively. At the opposite end of the shear pin link 148 is a connecting pin hole 154 and the link is clamped so that a line joining the holes 152 and 154 is perpendicular to the axis of the torque arm 128. The torque arm assembly 127 is retained on the second sun gear hub spline 108 by a nut 156 while the complete gear subassembly 90 is retained on the shaft 36 by a smaller nut 158 with a conventional cap 160. The cap 160 and the conventional seal 161 at the opposite end seals the bearing grease cavity defined by the bore of the second sun gear 98.

Figure 4:
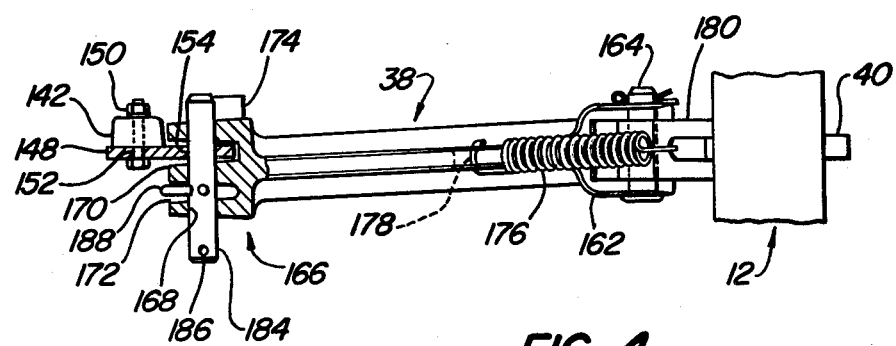
FIG. 4 is an enlarged partially cross sectioned partial view taken approximately on line 4—4 of FIG. 1 showing the pinned and shear bolted connection of the control link to the torque arm of the transmission assembly.

The control link 38, best seen in FIGS. 1 and 4 and swingable in a vertical plane (perpendicular to the axis of cylinder shaft 36), is pivoted on pivot bracket 40 by a clevis end 162 and retained by clevis pin 164. It has, at its opposite end, a double clevis 166 with a through bore 168 parallel to the control link pivot axis (pin 164). The double clevis 166 defines inner and outer clevis slots 170, 172 respectively. A stop lug 174 extends inwardly, adjacent the inner clevis slot 170 just below the bore 168. A tension spring 176 is connected between a spring slot or eyelet 178 in the control link 38 and a stop bracket 180 rigidly attached to the combine body 12.

In harvesting operation, combine function is generally conventional with various adjustments of functional elements being made to suit crop and operating conditions. Among these are threshing cylinder rotational speed, selectively controllable by means of the variable speed drive 17 in either of two speed ranges as provided by the present embodiment of the invention. These ranges correspond to direct drive or coupling between the V-belt grooves 76 and the cylinder shaft 36 (FIG. 5.) or indirect, through the speed reducing gear train (FIG. 3).

Figure 5:
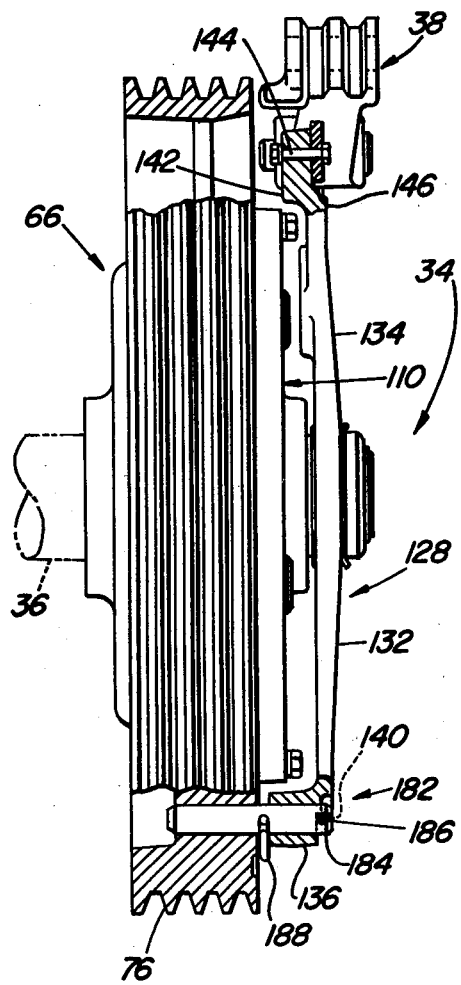
FIG. 5 is a view similar to FIG. 3 showing a connecting pin coupling the torque arm directly to the threshing cylinder sheave for the direct drive mode.

The direct drive mode is selected by aligning the bore 138 in the torque arm assembly 127 with any one of the three similar bores 80 in the sheave portion 66 and, as indicated in FIG. 5, inserting a control pin assembly 182. The pin assembly consists of a control pin 184 with a spring pin 186 in a cross drilled hole at one end. The pin assembly 182 is retained by a hair pin cotter 188. It will be noted that the cross drilled holes in the control pin 184 are timed together and that possible rotation of the pin is limited by engagement between the spring pin 186 and the spring pin stops 140 of the arm portion 132 so that the hair pin cotter 188 is maintained in an alignment such as to avoid inadvertent retraction of the pin due to centrifugal force when in operation. In the direct drive mode, the control link 38 is retained in a retracted position against the stop bracket 180 and clear of the rotating torque arm assembly 127 (as indicated in phantom outline in FIG. 1), under the action of the tension spring 176. (In FIG. 5, the control link 38 appears in a partially retracted position.) In this configuration, with the torque arm assembly 127 coupled to the sheave, the second sun gear 98 is prevented from rotating with respect to the sheave portion 66 (and the V-belt grooves 76) so that drive is direct, by way of the non-rotating compound planetary pinions 120 through the first sun gear 94 and into the cylinder shaft 36, with no relative movement of gears.

Figure 3:
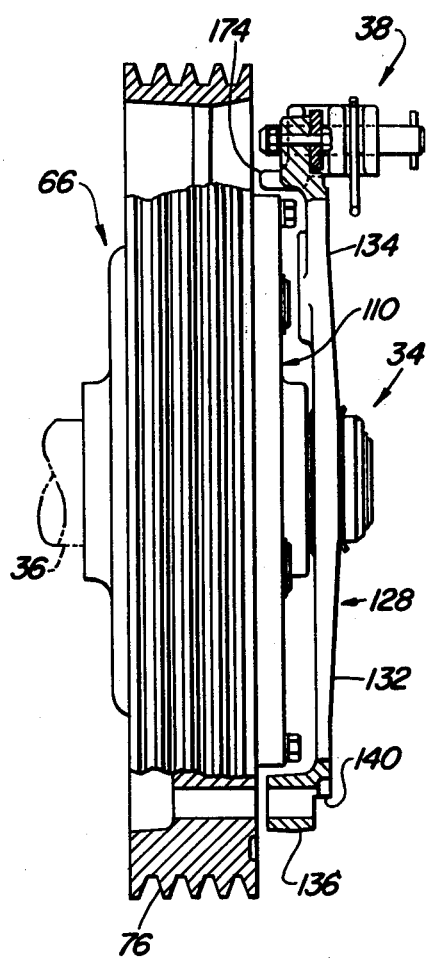
FIG. 3 is a view similar to FIG. 2 but on a reduced scale and only partially cross sectioned. The control link is connected to the torque arm for the reduced output speed mode.

For the reduced output speed mode, illustrated in FIGS. 1, 3 and 4, the shear link 148 carried on the torque arm portion 134 and the double clevis end 166 of the control link 38 are brought together, with the shear link 148 entering the inner clevis slot 170 and the bores 154 and 168, of the shear link and clevis respectively, in alignment. To couple these elements, the single control pin assembly 182 is again used and is inserted so that it may be retained by the insertion of the hair pin cotter 188 in the outer clevis slot 172 and into the control pin 184. The timing together of the two holes in the control pin 184 makes it easier to insert the hair pin cotter in both modes in that the (visible) alignment of the spring pin 186 serves as a guide to the position of the hole into which the hair pin cotter must be inserted. In the reduced output speed mode, the control link 38 secures the torque arm assembly 127 stationary relative to the combine body 12, so that the second sun gear 98 is also held stationary and power is transmitted from the V-belt grooves 76 through the speed reducing epicyclic gear train—second or input sun gear 98, second pinion 124, first pinion 122 to first or output sun gear 94 and the cylinder shaft 36.

The torque arm assembly 127 forms an efficient control or power transmission element in that at the input point (either of the control connection points, torque arm bosses 136, 142, radially adjacent the pulley drive surface, grooves 76) tangential forces are relatively low because of the radial distance from the axis of the shaft 36, permitting relatively light components to be used.

In the reduced output speed mode, the torque which may be applied to the driven functional elements (cylinder shaft 36 and threshing cylinder 11) for a given power input is of course increased and it may be within the capacity of the driving elements such as V-belts 22 and 42 to overload the cylinder shaft and/or threshing cylinder. The shearable connection or coupling (shear bolt with nut 150 connecting shear link 148 to shear bolt boss 142 of the torque arm assembly 127) is of course designed to fail or shear at a torque level such that the shaft and cylinder (or other components) are not damaged. Upon shearing, the torque arm assembly 127 is of course free to rotate but the control link 38 is immediately retracted by the spring 176 and held against the stop 180 so that the torque arm assembly 127 may rotate without interference.

Shearing of a shear bolt 150 may result for example from an overload condition caused by uneven or excessive feeding of the threshing cylinder 11. Correction of the overload condition and installation of another shear bolt with nut 150 permits operation to continue. For convenience, a supply of shear bolts is stored in a bracket 190 (see FIG. 1) attached to the combine frame conventionally close to their point of use.

The connections or control operations required to establish either the direct drive or reduced output speed modes are of course simple and easy to understand. However, the control components involved are designed to include features which facilitate changing from one mode to another in the field and prevent inadvertent miscoupling of components. For example, the thoughtless tying of the control link 38 to the driven sheave is prevented by the control link stop lug 174 engaging the shoulder of the sheave body portion 110 and preventing the alignment of the control link bore 168 with the bore 80 of the sheave boss 78 (see FIG. 3). Also, because the control pin bore 80 in the sheave is at a smaller swing radius than that of the control pin hole 154 in the shear link 148, it is not possible, when coupling the control link 38 to the shear link 148, inadvertently to insert the control pin 184 so far through the control link as to engage a control pin bore 80 in the driven sheave thus preventing rotation of the sheave.

Figure 2:
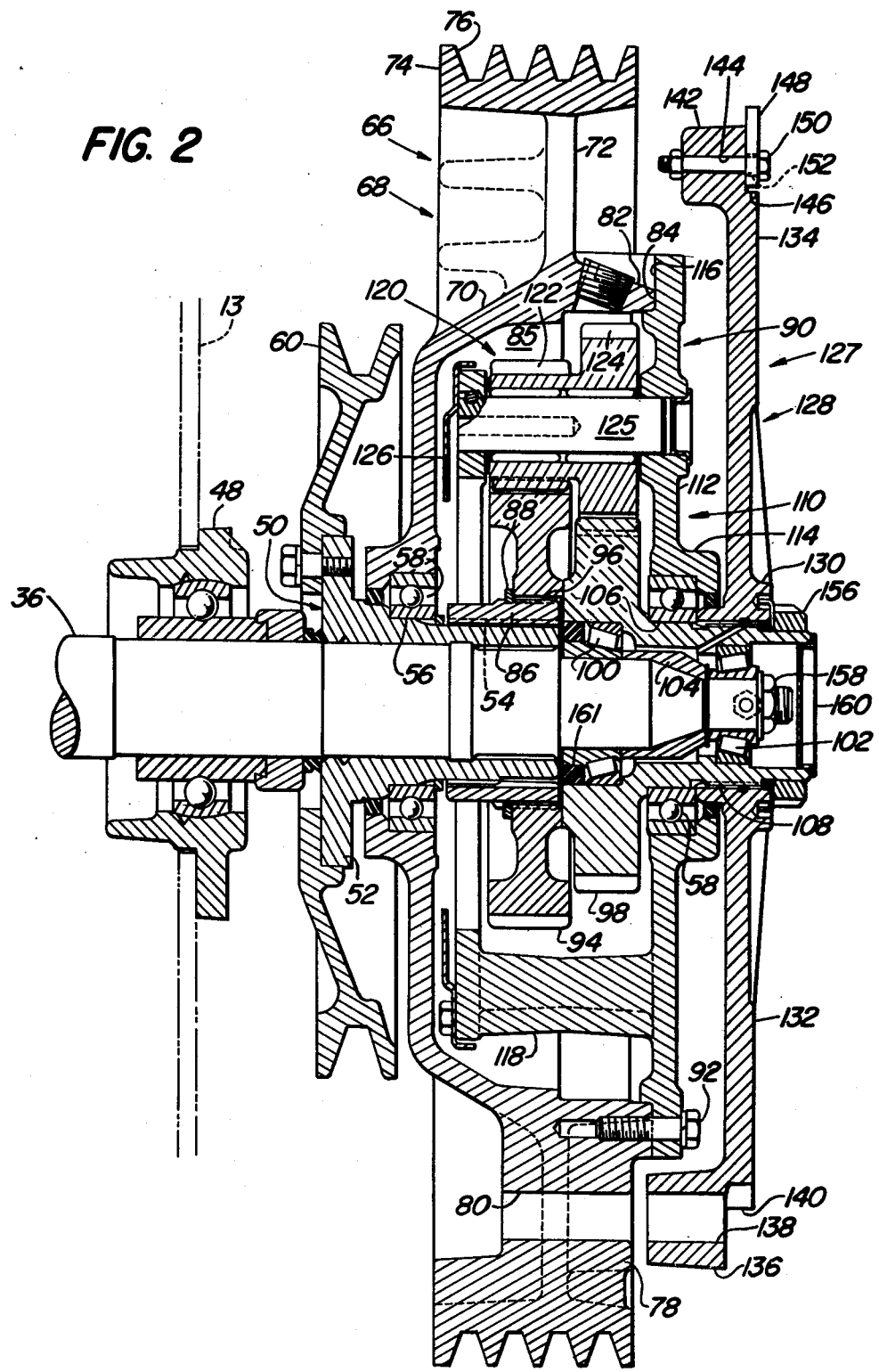
FIG. 2 is an enlarged cross-sectional partial view taken approximately on line 2—2 of FIG. 1 showing the two-speed cylinder final drive transmission assembly and an outboard portion of the threshing cylinder shaft which it drives and on which it is supported.

The compactness of a threshing cylinder (or other machine component) power transmission assembly according to the invention, can be appreciated from FIG. 2. The external functional portions of the assembly (beater drive sheave 60 and V-belt grooves 76) are spaced closely alongside the outside of the separator body wall 13. The gear-train portion of the transmission is housed axially substantially within the axial extent of the rim 74 (with its V-belt grooves 76) and the torque arm assembly 127 increases only slightly the outward extension from the combine body wall 13 of the complete transmission assembly. The convenience and simplicity of changing between the direct drive and reduced speed modes is readily apparent from the drawings. The same single shiftable element (control pin assembly 182) is used in both modes so that the common problems of storage and/or misplacement of loose parts do not arise. The control pin 184 is an easy fit in the bores of sheave, control arm and control link and no tools are required to change from one drive mode to the other. Having a choice of three spaced direct drive connecting bores 80 in the pulley makes completing the direct drive setting more convenient. And wear of the meshing but non-rotating gears in this mode is potentially reduced in that three different "locked" gear positions are available.

Assembly, disassembly and servicing of the transmission assembly 34 is simple and convenient. For example, with cap screws 92, cap 160 and nut 158 removed, the complete gear subassembly 90 may be pulled from the cylinder shaft 36 providing unobstructed access to the outward facing gear housing cavity 85 and to the gear train components without removing the relatively heavy inboard sheave portion 66 from the cylinder shaft 36. However, the complete transmission assembly 34 (less retaining nut 158 and cap 160) may be mounted on or disassembled from the cylinder shaft as a unit, as may be convenient in manufacturing assembly or in certain service operations.

We claim:

1. A transmission for the drive system of a mobile harvester functional element, the element being connected to a driven shaft, and the harvester having a power source and a frame, comprising:

a pulley carried concentrically by the driven shaft and having a body including a gear train with a plurality of gears including an output gear directly and drivingly connected to the shaft and an input gear journalled concentrically with the shaft and intermediate gear means for transmitting power between the input and output gears;

control means operable alternatively to couple the input gear to the pulley body for a first drive mode and to tie the input gear to the frame of the harvester for a second drive mode including a torque element drivably connected to and non-rotatable with respect to the input gear and a control link for connecting the torque element to the frame of the harvester, said link, in operation, being under load, and automatic disconnect means connecting the torque element to the control link and operable to disconnect the control link from the torque element at a predetermined load so as to limit the torque input to the transmission; and drive means connecting the pulley to the power source.

2. In a combine harvester having a body including spaced apart first and second sidewalls and a threshing cylinder extending between the walls, the cylinder being carried on an axial shaft extending through the first wall, a two-speed transmission for the cylinder supported adjacent and external to the first wall comprising:

a first sun gear mounted on the shaft for directly driving the shaft;

a second sun gear rotatably and coaxially carried by the shaft;

a pulley rotatably and coaxially carried by the shaft and having a body and a peripheral circumferentially extending drive surface;

a compound planetary gear set carried by the pulley body for rotation about an axis parallel to the shaft axis and including coupled first and second pinions drivingly engaging and cooperating with the first and second sun gears respectively to constitute an epicyclic gear train, the body of the pulley constituting a housing having spaced apart, generally radially extending inboard and outboard walls, the inboard wall being towards the first wall of the combine body, the epicyclic gear train being contained between the walls of the pulley housing and including an inboard bearing and an outboard bearing each concentric with the shaft for rotatably journalling, respectively, the inboard and outboard walls of the pulley housing, the second sun gear including an axially extending hub and said outboard wall of the pulley housing being journalled on said hub by its respective bearing, said hub extending externally of said wall; and means for controlling the second sun gear, disposed externally adjacent the outboard wall of the pulley housing, including a generally radially extending torque arm carried by the hub external to the pulley housing and a shiftable element for selectively connecting the torque arm to the pulley body or to the body of the combine, said arm including first and second control connecting points, and a control link pivotally connected to the harvester body, the shiftable element including a control pin for selectively coupling the torque arm to the body of the pulley at the first control connecting point of the torque arm or to the control link at the second control connecting point of the torque arm to establish, selectively, at least two drive modes, including a direct drive mode in which the second sun gear is connected directly to the pulley body, so as to prevent rotation of the planetary pinions so that when the pulley is rotated, the shaft is driven directly by the planetary pinions through the first sun gear at the same rotational speed as the pulley, and a speed changing mode in which the second sun gear is non-rotatably connected to the combine body so that as the pulley is rotated, speed of rotation of the shaft is determined by the gear ratios of the epicyclic gear train.

3. The transmission of claim 2 and further including a beater drive pulley carried concentrically and in fixed relation to the shaft between the first wall of the combine body and the pulley housing.

4. A transmission for the drive system of a mobile harvester functional element, the element being connected to a driven shaft, and the harvester having a power source and a frame, comprising:

a pulley carried concentrically by the driven shaft and having a body including a gear train with a plurality of gears including an output gear directly and drivingly connected to the shaft and an input gear journalled concentrically with the shaft and intermediate gear means for transmitting power between the input and output gears;

control means operable alternatively to couple the input gear to the pulley body for a first drive mode and to tie the input gear to the frame of the harvester for a second drive mode, said control means including a torque arm drivably connected to and non-rotatable with respect to the input gear and means including a control link for alternatively coupling the torque arm to the body of the pulley and to the harvester frame, said control link being connectable at one end to the torque arm and, at its opposite end, pivotally connected to the frame, and means for biasing the control link away from the torque arm when said link and arm are not connected; and drive means connecting the pulley to the power source.

5. The transmission of claim 4 wherein, in operation, the control link exerts a restraining force on the torque arm and the connection of the control link to the torque arm includes automatic disconnect means operable to release the torque arm when the restraining force exceeds a predetermined level so that the control link, respective to the bias means, may be urged away from the torque arm.

* * * * *

UNITED STATES PATENT AND TRADEMARK OFFICE
CERTIFICATE OF CORRECTION

PATENT NO. : 4,454,787

DATED : 19 June 1984

INVENTOR(S) : Mahlon L. Love; Leon J. Corkery

It is certified that error appears in the above-identified patent and that said Letters Patent is hereby corrected as shown below:

Column 10, line 7, delete "respective" and insert -- responsive --.

Signed and Sealed this

Twenty-ninth Day of January 1985

[SEAL]

Attest:

DONALD J. QUIGG

Attesting Officer     Acting Commissioner of Patents and Trademarks